Oct. 14, 1969  F. K. KUNDERMAN  3,472,566

TILTING PAD BEARING ASSEMBLY

Filed Sept. 18, 1967

INVENTOR.
FRED K. KUNDERMAN
BY Peter J. Murphy

ATTORNEY

United States Patent Office 3,472,566
Patented Oct. 14, 1969

3,472,566
TILTING PAD BEARING ASSEMBLY
Fred K. Kunderman, Olean, N.Y., assignor to Dresser Industries, Inc., Dallas, Tex., a corporation of Delaware
Filed Sept. 18, 1967, Ser. No. 668,377
Int. Cl. F16c *17/06*
U.S. Cl. 308—73                                    5 Claims

ABSTRACT OF THE DISCLOSURE

A disc-shaped bearing assembly includes an annular bearing ring of rectangular cross section, sandwiched between annular cover plates, the cover plates having an inner diameter slightly larger than the journal to be supported. Disc-like bearing shoes are half-moon in shape, having an outer periphery extending greater than 180°, and having a concave cylindrical bearing surface. The cover plates are provided with confronting circular recesses which open to the radially inner surfaces of the cover plates, the peripheries of these recesses having an angular extent greater than 180°. These recesses extend radially outward to the inner diameter of the angular bearing ring, so that the bearing shoes will engage the inner diameter of the bearing ring to transfer the bearing load from the shoes to the ring. The above assembly is fabricated in semicircular halves, the two halves being secured together by means of studs passing through the bearing ring; and the side plate sections being bolted to the respective bearing ring sections.

BACKGROUND OF THE INVENTION

This invention is concerned with journal bearings, and particularly to those of the type provided with a plurality of bearing blocks or shoes which are pivotally supported. In such bearings as have been proposed heretofore, the pivoting is effected by means of pins passing through suitable apertures in the shoes, the pins being supported in the bearing housing. In some such bearings, the total load on the bearing is taken by the pins whereby the maximum pressure allowable is unnecessarily limited. In other such bearings, the bearing load is taken by a bearing member enclosing the shoes; and the pins are provided for the purpose of preventing rotation of the shoes within the stationary members of the bearing and to prevent the bearing shoes from falling out of the bearing assembly when the bearing is removed from the journal. In either case, it is necessary to provide bores through the bearing shoes to accommodate the pins; and such bores produce undesirable stresses within the bearing shoes.

Objects of the present invention are to overcome the above-mentioned disadvantages; and to provide an improved tilting pad journal bearing of reduced size, having a rugged construction, and designed for ease of manufacture.

SUMMARY OF THE INVENTION

A bearing, according to the invention, comprises a housing defined by a bearing member, having an internal bearing surface, sandwiched between cover plates to define an annular chamber. Disc-like bearing shoes are retained in aligned and confronting circular recesses provided in the cover plates to prevent rotation of the bearing shoes while permitting individual pivotal movement. The recesses open to the journal openings of the cover plates, the recesses being positioned relative to the journal openings to define recess peripheries having an angular extent greater than 180°. The bearing shoes have concave cylindrical bearing surfaces, complementary to the journal, exposed to the journal at the recess openings.

BRIEF DESCRIPTION OF THE DRAWING

The invention is diagrammatically illustrated by way of example in the accompanying drawings, in which.

DESCRIPTION OF THE PREFERRED EMBODIMENT

Figure 2:
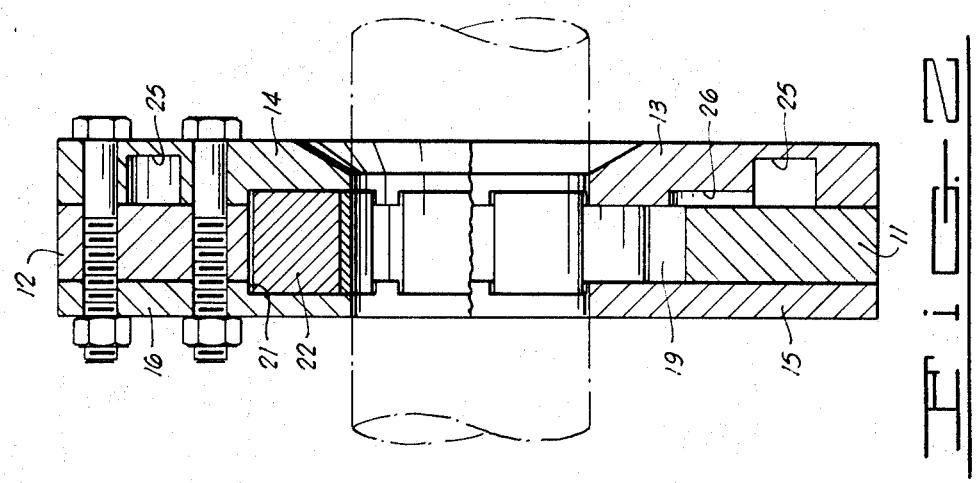
FIG. 2 is a sectional view taken along the line 2—2 of FIG. 1, looking in the direction of the appended arrows.

In a preferred embodiment of a bearing assembly according to the present invention, the bearing includes a housing which is defined by: an annular bearing ring defined by two identical halves 11 and 12; an annular inner cover plate defined by substantially identical halves 13 and 14; and an annular outer cover plate defined by identical halves 15 and 16. The bearing ring halves are rectangular in radial section; and the bearing housing is assembled in two halves wherein the cover plates are secured to the bearing ring by means of bolts which pass through aligned apertures in these members, and associated nuts. A viewed in the drawing, the lower half of the bearing housing is defined by the bearing ring portion 11, inner cover plate portion 13, and outer cover plate portion 15; while the upper half of the housing is defined by the bearing ring portion 12, inner cover plate portion 14, and outer cover plate portion 16.

The parting surface for the housing portions, then, is on a diametral plane of the housing assembly which defines a disc-like structure; the bearing ring and cover plates having the same outer diameters; and the cover plates having inner diameters only slightly larger than the journal to be supported.

For the purpose of securing the housing halves together, the annular ring portion 12 of the upper housing half is provided with bores 17 passing through the ring portion along axes perpendicular to the parting surface, these bores being counterbored at the ends opening to the outer periphery of the annular ring portion to accommodate cap screws 18. The annular ring portions of the lower housing half are provided with aligned tapped recesses for accommodating the cap screws. In this manner, the two housing halves are readily assembled to or disassembled from the journal.

Referring to the housing assembly as a whole, the inner diameter of the bearing ring 11, 12 is substantially larger than that of the journal apertures for the cover plates, whereby an annular chamber 19 is defined surrounding the journal being supported. The journal is indicated in phantom in the drawings. The opposing inner faces of the cover plates, within the chamber 19, are provided with pairs confronting circular recesses 21 which open to the journal apertures of the cover plates. These recesses are positioned so that the radially outermost walls thereof are generally tangent to the inner diameter of the bearing ring. The recesses 21 open to the journal apertures in a manner such that the recesses do not define a complete circle, but rather have the form of a half-moon as viewed along the axis of the bearing. The bearing is dimensioned, however, so that the angular extent of the cylindrical walls of the recess is somewhat greater than 180°.

Supported within each pair of confronting recesses 21 is disc-like bearing shoe 22 which, as viewed along the bearing axis, also have a half-moon shape. These shoes have an outer diameter which is slightly smaller than the diameter of the recesses 21, to permit pivotal or rotational movement of the shoes within the respective recesses; and have a length slightly less than the distance between the confronting bottom faces of the recesses 21, also to permit freedom of pivotal or rotational movement. The shoes are dimensioned to extend radially inward through the recess openings, and are provided with cylindrical bearing surfaces faced with a layer of suitable bearing material for engagement with a journal. When supporting a load, the bearing shoes engage tangentially the inner cylindrical surface of the annular bearing ring 11, 12 whereby the bearing load is transferred to the housing structure.

For the purpose of providing lubricant to the bearing shoes 22, an annular groove 25 is provided in the inner face of the inner cover 13, 14 to define with the bearing ring, a closed annular chamber. This groove 25 is communicated with a source of lubricant by means of any suitable passage opening to the exterior of the bearing housing. The groove communicates with the bearing chamber 19 by means of one or more radial grooves 26, also provided in the inner face of the inner cover 13, 14.

For the above described arrangement, the bearing shoes 22 are retained within the housing, only by the fact that they are confined within the respective confronting recesses 21; and these recesses, of course, prevent the bearing shoes from rotating relative to the axis of the bearing housing. When the bearing is assembled on a journal, the bearing surfaces of the several shoes 22 engage and support the journal. As described, the dimensional relations are such that the radially outer surfaces of the shoes 22 tangentially engage the inner bearing surface of the bearing ring 11, 12, whereby load is transferred from the bearing shoes 22 to the bearing ring.

A feature of the above described assembly is the simplicity of design, and therefore ease and economy of manufacture. Further the bearing is easily assembled on a journal by the fabrication of two halves secured together by cap screws 18.

A further feature of the invention is that, when the two halves of the bearing are disassembled, the bearing shoes 22 are retained within the bearing housing since the angular extent of the cylindrical walls of the recesses 21 and of the outer surfaces of the shoes 22 are greater than 180°. In this manner, the shoes are retained within the housing without the use of pins or other devices which require bores or other cutouts in the bearing shoes, creating undesirable stress conditions.

Figure 1:
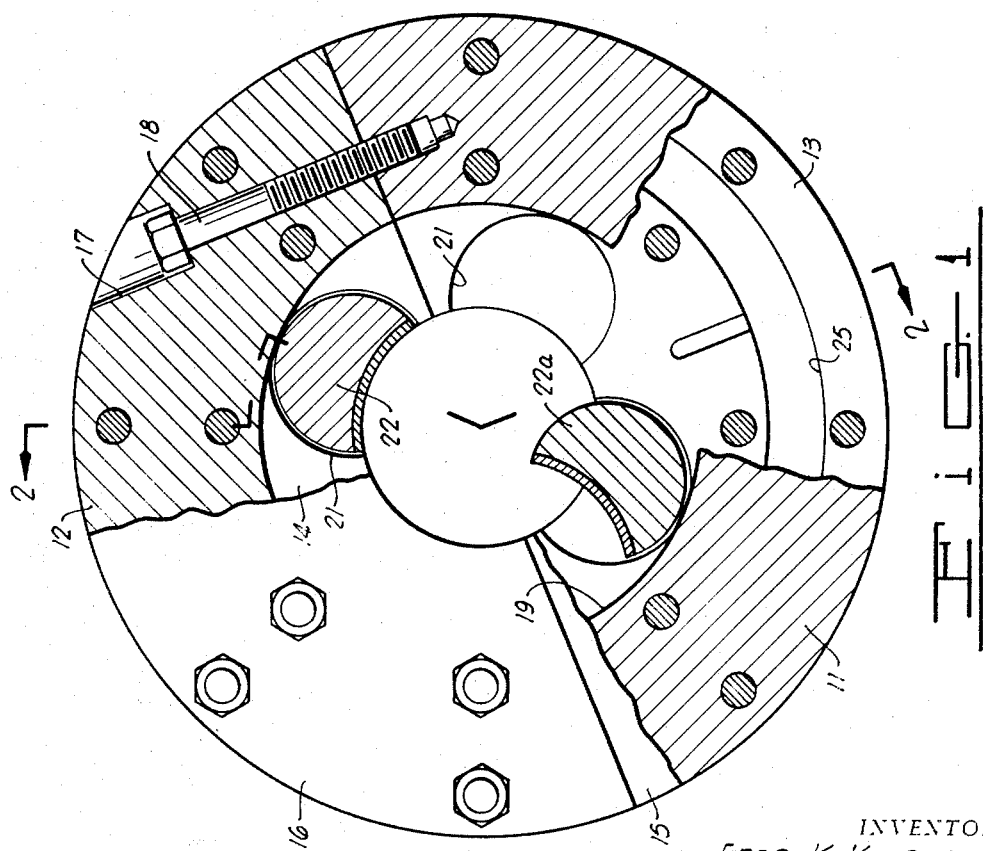
FIG. 1 is a side view of a bearing assembly, partially broken away to show the internal structure and arrangement.

While the bearing shoes are retained within the respective halves of the housing, as above described, yet the shoes are readily removed from the bearing housing for the purpose of inspection or replacement without complete disassembly of the bearing housing. This is accomplished as illustrated by the position of the bearing shoe 22a in FIG. 1. The bearing shoe 22a is merely rotated within its confining recesses 21 to the position shown, and it may then be withdrawn in a radially inward direction through the recess openings to the journal apertures. For this purpose, the minimum transverse dimension of the shoe is necessarily less than the width of the recess opening. Should the bearing be removable from the journal without disassembly into its two halves, the shoes may be removed for inspection through the above-mentioned recess openings and the journal aperture of one of the cover plates.

The embodiments of the invention in which an exclusive property or privilege is claimed are defined as follows:

1. A journal bearing comprising
   a bearing member defining an internal cylindrical bearing surface; covers secured to the opposite sides of said member, defining therewith a supporting housing; said covers having central apertures dimensioned slightly larger than the journal to be supported; said member and said covers defining, with the journal, an annular chamber;
   said covers being provided with a plurality of circular recesses in the confronting walls thereof within said chamber, arranged in axially aligned pairs; said recesses opening to the central apertures of said covers and extending radially outward beyond the cylindrical bearing surface of said member;
   a disc-like bearing shoe supported in each of said recess pairs engaging said cylindrical surface and dimensioned to be closely received within said recesses for rotational movement therein; and each said shoe being provided with a concave cylindrical bearing surface, parallel to the axis thereof, for engaging the journal to be supported.

2. A bearing as set forth in claim 1 wherein the walls of said recesses have an angular extent greater than 180°; and wherein said bearing shoes have an outer cylindrical surface having an angular extent greater than 180°; said shoes being thereby confined within said recesses.

3. A bearing as set forth in claim 2 wherein the minimum transverse dimension of a bearing shoe is less than the width of the opening defined by a respective recess wall and the central cover aperture, whereby said shoe may be removed from said chamber annular chamber through said opening.

4. A bearing as set forth in claim 1 wherein said supporting housing is a split in an axial plane, defining two halves thereof, each pair of confronting cover halves being attached to a respective annular member half; and fastener means associated with the annular member halves for joining said housing halves at the parting plane.

5. A bearing as set forth in claim 1 wherein said bearing member is an annular ring of rectangular cross-section; and wherein said covers are annular plates having the same outside diameter as said bearing member; and said supporting housing thereby defining a disc-shaped assembly.

References Cited

UNITED STATES PATENTS

| | | | |
|---|---|---|---|
| 1,161,721 | 11/1915 | Parsons | 308—73 |
| 1,562,644 | 11/1925 | Jones | |
| 2,538,746 | 1/1951 | Dall | 308—73 |
| 3,297,371 | 1/1967 | Salzman | 308—73 |
| 3,339,990 | 9/1967 | Wendt | 308—73 |

FOREIGN PATENTS

| | | |
|---|---|---|
| 547,306 | 8/1942 | Great Britain. |

MARTIN P. SCHWADRON, Primary Examiner

LUCIOUS L. JOHNSON, Assistant Examiner